June 4, 1957   O. H. WILLIAMSON   2,794,761
COMPOSITE STRUCTURAL PANEL AND METHOD OF MAKING SAME
Filed Oct. 18, 1955   2 Sheets-Sheet 1
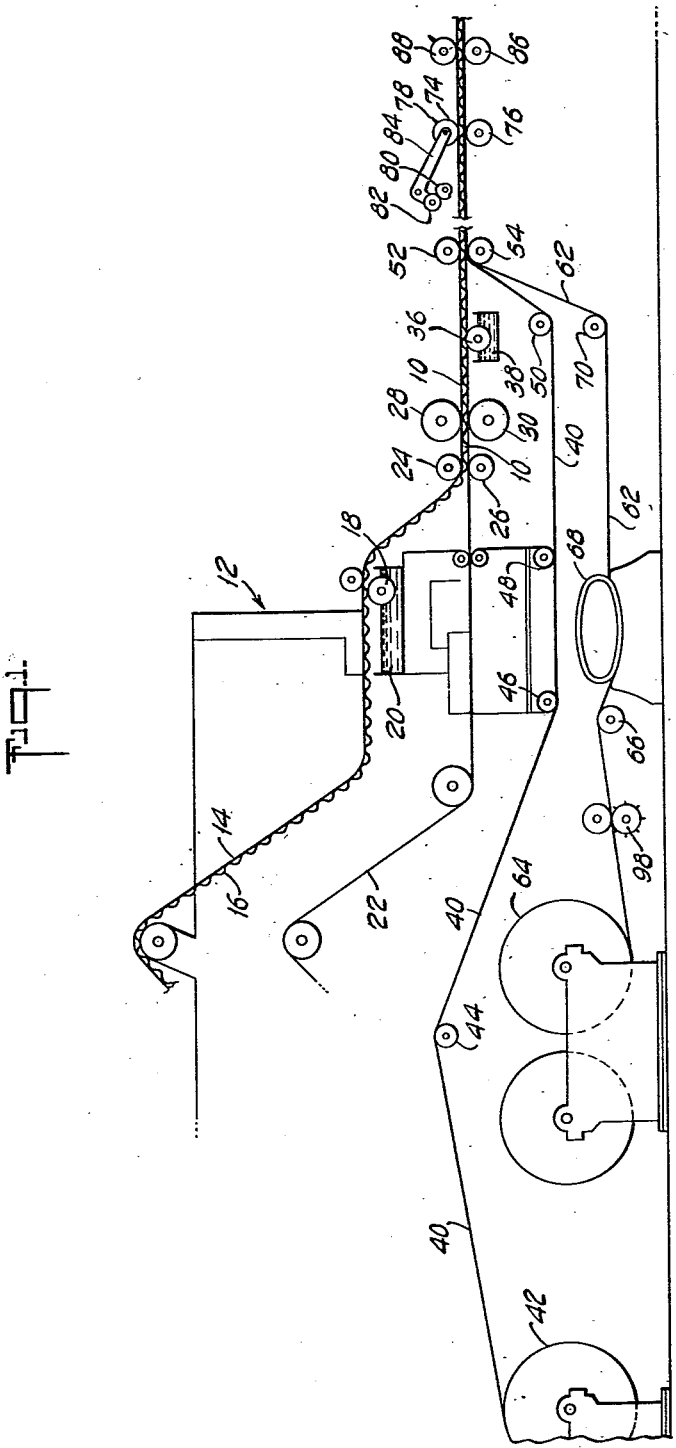
INVENTOR
OSCAR H. WILLIAMSON
BY
John J. McGlew
ATTORNEY

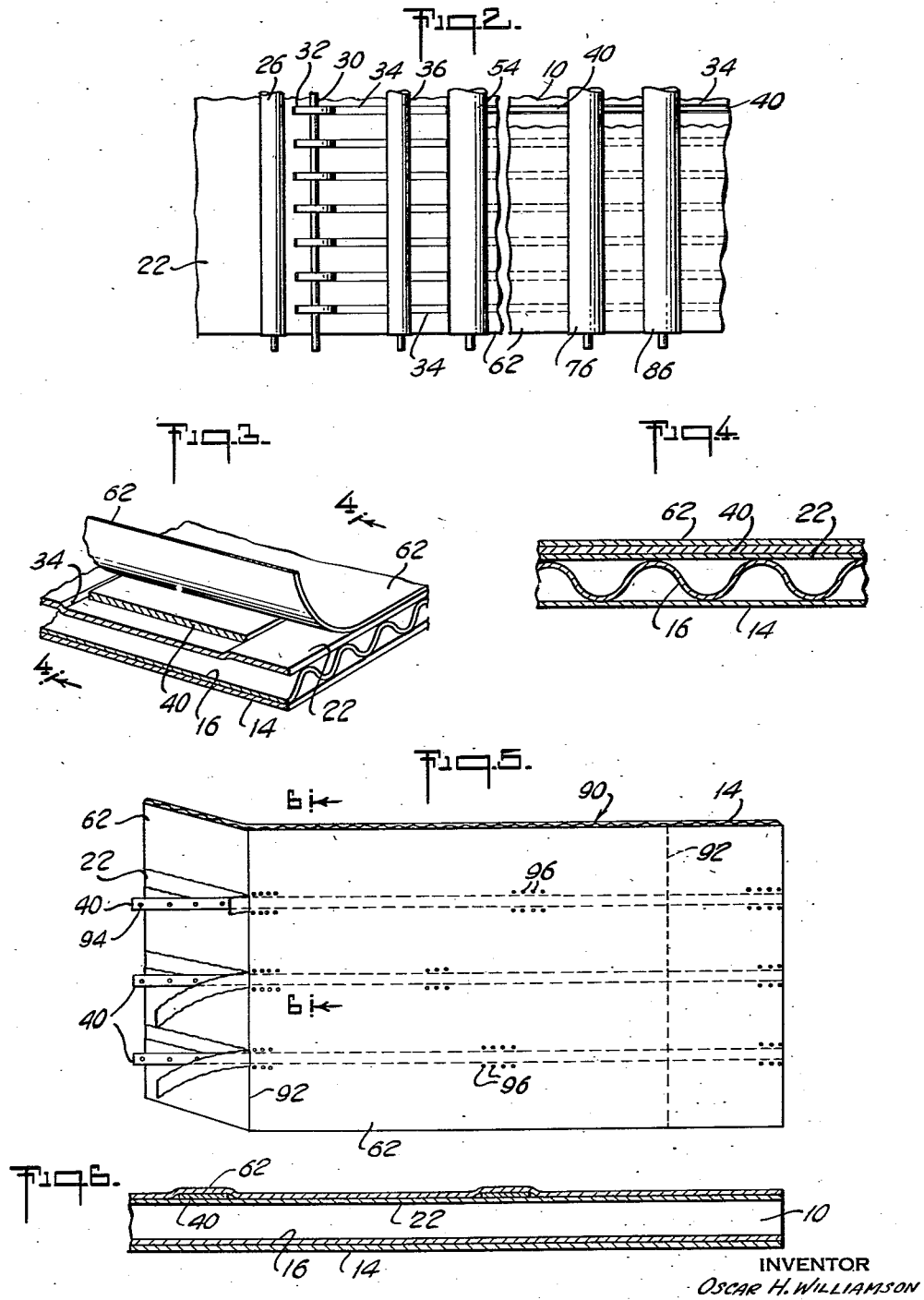

2,794,761

COMPOSITE STRUCTURAL PANEL AND METHOD OF MAKING SAME

Oscar H. Williamson, Riverside, Ill., assignor to International Paper Company, New York, N. Y., a corporation of New York Application October 18, 1955, Serial No. 541,128

4 Claims. (Cl. 154—118)

This invention relates in general to structural panels and particularly to a new and useful structural panel of corrugated paperboard reinforced by a plurality of reinforcing straps formed integral with the panel and to a method of fabricating such panels.

A structural panel constructed in accordance with this invention is lightweight, easy to handle, and inexpensive, and yet strong enough for uses where materials much stronger, heavier and more expensive than corrugated paperboard were heretofore required. The reinforcing straps made of metal, woven tapes, glass fibers or similar materials are formed as an integral part of the panel during its fabrication and no external means for fastening them to the corrugated board is required as was the case heretofore. Nail holes are provided in the straps and means are provided on the panel for easily exposing the straps for nailing purposes.

Thus the invention provides a panel which is inexpensive to manufacture and to position and attach at the place of use and provides means for fabricating such a panel directly on a corrugating machine.

Accordingly, it is an object of this invention to provide means for fabricating individual lengths of structural panels comprising double-faced corrugated paperboard and a plurality of spaced parallel reinforcing straps attached to one face of the paper board beneath an overlying layer of paper adhesively secured to the face.

It is a further object of this invention to provide a method of manufacturing structural panels whereby newly formed double-faced corrugated board is passed through a set of rollers adapted to apply adhesive to one of the faces and a plurality of spaced parallel reinforcing bands are fed over the adhesived face beneath a layer of paper fed thereover and secured to the face by pressure.

A further object of this invention is to provide a structural panel comprising a double-faced corrugated paperboard and a plurality of spaced parallel reinforcing straps secured to said board beneath a layer of paper applied over one of the faces.

A still further object is to provide a structural panel which is simple in design, rugged in construction and inexpensive to manufacture.

With these and other objects in view, the nature of which will become more apparent, the invention will be more fully understood by reference to the drawings, the accompanying detailed description and the appended claims.

In the drawings,

Fig. 1 is a somewhat schematic end view showing corrugated paperboard exiting from the double-facer section of a corrugating machine and being fed through apparatus for applying metal reinforcing bands and an outer layer of paper to one of its faces and including means located after the drying section for scoring the panels and cutting the panels into individual lengths;

Fig. 2 is a fragmentary bottom plan view taken along line 2—2 of Fig. 1;

Fig. 3 is a fragmentary perspective view showing a structural panel constructed in accordance with this invention;

Fig. 4 is a vertical section taken on line 4—4 of Fig. 3;

Fig. 5 is a perspective view of a complete structural panel constructed in accordance with this invention with one of the marginal edges folded back to expose the strap ends for nailing; and Fig. 6 is a vertical section taken on line 6—6 of Fig. 5.

Referring to the drawings in particular the invention as embodied therein includes a double-faced corrugated paperboard 10, shown in Fig. 1 exiting from the double-facer section of a corrugating machine generally designated 12. The double-faced corrugated board 10 includes a single face 14 to which a corrugating medium 16 is adhesively secured. The bottom arches of the corrugating medium 16 are passed over a gluing roll 18 which applies adhesive from a source 20 thereonto. The second or double face is added by directing a bottom liner 22 into contact with the corrugating medium 16 between rollers 24 and 26 in order to adhesively secure the liner 22 to the medium 16.

In accordance with the invention the double-faced corrugated board 10 as it is newly formed is passed between cooperating ironing rollers 28 and 30. The lower ironing roller is provided with a plurality of spaced parallel ironers 32 which are effective to compact the corrugated board 10 and impress a plurality of spaced parallel channels 34 onto the corrugated board. The channels 34 are formed to provide recesses for reinforcing strapping to be applied thereafter.

The corrugated board 10 is then passed over a gluing roller 36 which is effective to apply adhesive from a supply 38 onto the bottom face 22 thereof.

Metal strapping 40 or similar reinforcing bands made of woven tapes, glass fibres or the like are unwound from spaced sets of reels 42 passed around guiding rollers 44, 46, 48 and 50 and fed between cooperating upper and lower rollers 52 and 54 through which the corrugated board 10 is passed. A light liner paper is also fed between the cooperating rollers 52 and 54 and is adhesively secured over the bands 40 to the liner face 22. The liner paper 62 is unwound during feeding from a reel supply 64 and passed over a steam heating roller 66 and a steam ironing table 68 and around guide roller 70 before it is fed between the rollers 52 and 54. The steam heating roller 66 and table 68 provide sufficient heat and moisture to the liner 22 to permit its rapid adhesion to the corrugated board 10 as it is passed between rollers 52 and 54. Instead of a full sheet of liner paper 62 it is often desirable to use a plurality of strips of paper each wide enough to cover the metal straps 44 and overlap sufficiently to hold them to the corrugated board. When paper strips are used instead of the full sheet of liner paper 62 a plurality of gluing rollers similar to the roller 36 but each only as wide as the paper strips is employed to apply adhesive to the face 22 only in the areas over which the paper strips are to be applied.

In some intances it is desirable to leave the marginal edges of the finished structural panel free of adhesive in areas underlying the metal strapping 40. In these instances two adhesive-applying rollers similar to the roller 36 would be provided. One roller would be provided with grooves of sufficient width to permit the application of glue onto the margins of the liner 22 only in areas where the strapping would not lie. Another roller identical with the roller 36 would be used to apply glue over the whole area between the margins. Each of these rollers would be cam-activated to move into and out of engagement with the liner 22 to apply adhesive at proper positions thereon. Any combination of grooved or non-grooved adhesive-applying rollers and many variations of cam operation could be used.

After the corrugated board is brought into contact with the band 40 and the liner 22 by the rollers 52 and 54 it is passed through a drying section of the corrugating machine (not shown). The complete corrugated board 10 with the metal bands 40 and the liner 62 adhesively secured to the bottom face is then passed between cooperating rollers 74 and 76 which are effective to transversely score the upper face 14 along a line spaced from what will be each end of the finished panel and thereby define the marginal edges thereon. The roller 74 is provided with suitable scoring means on its outer periphery and is moved by means of a cam 80 and a roller 82 acting through a bell crank 84 to contact the face 14 at definite intervals to score it at desired spaced positions to form marginal score lines on the finished panel.

The corrugated board 10 with the straps 40 and the liner 62 adhesively secured thereto is then passed between cooperating cutting rollers 86 and 88 which are effective to cut the corrugated board into the desired structural panel lengths. Longitudinal slitters may also be provided in cases where it is desired to cut the sheets into smaller widths.

The complete structural panel generally designated 90, as shown in Fig. 5, is scored along lines 92, 92 by the roller 74 to permit the corrugated board with the outside light liner 62 attached to be folded at right angles to the center portion of the structural panel and to expose the straps 40 for nailing to a wall or other structural element. For nailing purposes the straps 40 are provided with nail holes 94 at spaced intervals along the marginal edges of the panel 90. The straps 40 may be ripped free of the bottom face of the corrugated board 10 by tearing the liner 62. The liner 62 is usually a very lightweight kraft paper which may be easily torn in this manner.

In some instances it may be desirable to use a heavy kraft paper as the liner 62 and to perforate it as at 96 in positions corresponding to the edges of the metal band 40 and thereby permit the subsequent tearing of the liner and exposure of the straps 40 for nailing purposes. For this purpose a plurality of spaced cooperating perforating wheels 98 may be located on the corrugating machine 12 adjacent the reel supply 64. The wheels 98 are cam-operated to imprint perforations 96 along the liner 62 either coextensive with the entire width of the liner or only in the areas of the marginal edges, as desired.

In some instances it may be desired to form a structural panel 90 without ironing or precompacting the corrugated board 10 (see Fig. 6). In such a case the metal bands 40 are set directly on the bottom of the corrugated board 10 and the paper liner 62 is supplied thereover and the ironing rollers 28 and 30 are not used. Figs. 3 and 4 show a structural panel in which the corrugated board 10 is precompacted and the metal strapping 40 is set in the grooves formed by the ironing rollers 28 and 30 so that they are flush with the board surface. The light liner 62 is supplied thereover as before but the straps do not project above the corrugated paperboard surface.

Thus the invention provides means for forming inexpensive, lightweight structural panels which are far stronger than corrugated paper board alone and which may be made at a minimum of additional expense by mechanism incorporated in ordinary corrugating machines.

While a specific embodiment of the invention has been shown and described in detail to illustrate the application of the invention principles, it will be understood that the invention may be embodied otherwise without departing from such principles.

I claim:

1. A method of forming a reinforced structural panel comprising continuously advancing corrugated board, applying adhesive to one of the faces thereof, continuously feeding a plurality of spaced parallel metal bands into contact with the adhesived face, continuously perforating a continuous sheet of paper along spaced parallel lines and continuously applying said perforated sheet over the adhesived face and said metal bands, with a line of perforations overlying each edge of said metal bands applying pressure to adhesively secure said sheet of paper and said metal bands to said corrugated board, periodically scoring said corrugated board on the face not covered by said perforated sheet along lines perpendicular to said metal bands whereby to form marginal foldable flaps and then cutting the complete assembly into desired lengths.

2. A structural panel comprising a corrugated board, a plurality of metal straps adhesively secured to said corrugated board, and a paper sheet overlying said straps and adhesively secured to said corrugated board and having spaced rows of perforations in positions overlying the edges of said metal straps.

3. A structural panel comprising a corrugated board having a plurality of precompacted channels on a face thereof, a reinforcing strap in each of said channels, and a paper sheet overlying said straps and adhesively secured to said corrugated board.

4. A structural panel comprising a corrugated board, a plurality of metal straps adhesively secured to said corrugated board, a paper sheet overlying said straps and adhesively secured to said corrugated board and having spaced rows of perforations in positions overlying the edges of said metal straps, and score lines made perpendicular to said straps across the face of said corrugated board on the side opposite from said metal straps whereby to form marginal foldable panels which may be folded away from the plane of the central portion of said panel upon the tearing along the perforations of said paper sheet overlying said straps in the area of said panels to expose the end portions of said straps.

References Cited in the file of this patent

UNITED STATES PATENTS

| | | |
|---|---|---|
| 1,425,914 | Swift | Aug. 15, 1922 |
| 1,600,396 | Campbell et al. | Sept. 21, 1926 |
| 2,570,614 | Wall et al. | Oct. 9, 1951 |

FOREIGN PATENTS

| | | |
|---|---|---|
| 214,797 | Great Britain | May 1, 1924 |